April 11, 1944.                R. D. PIKE                2,346,140
                PRODUCTION OF PURE SALTS FROM TRONA
                    Filed March 25, 1941        2 Sheets-Sheet 2
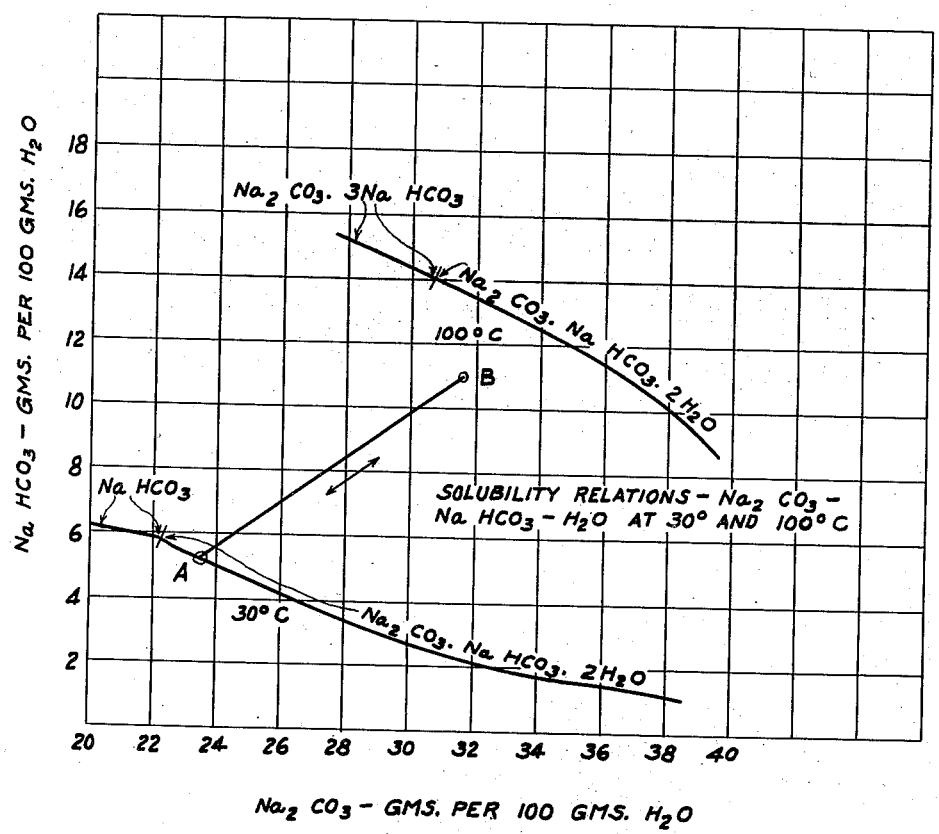

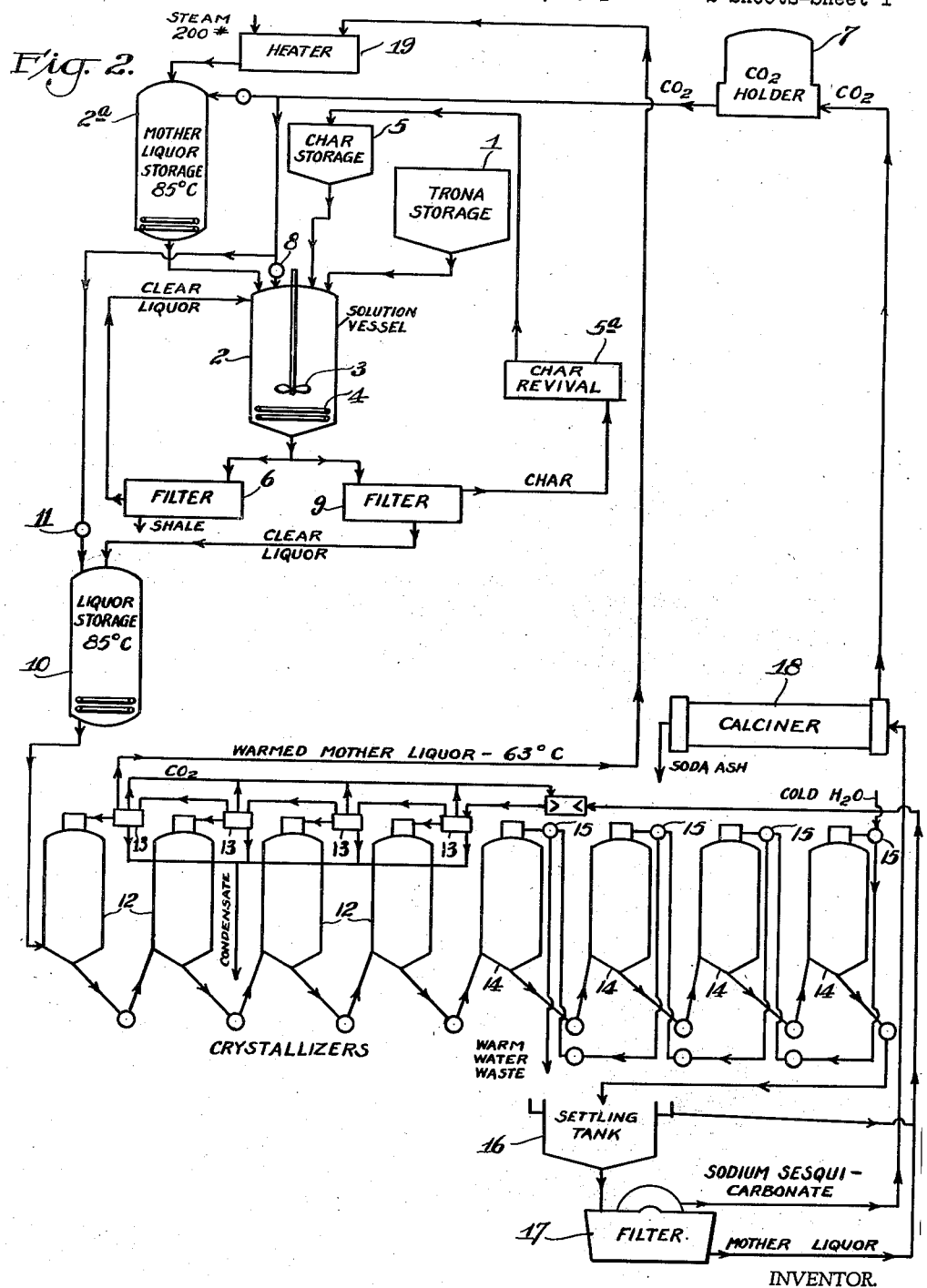

Patented Apr. 11, 1944

2,346,140

UNITED STATES PATENT OFFICE 2,346,140

PRODUCTION OF PURE SALTS FROM TRONA

Robert D. Pike, Pittsburgh, Pa.

Application March 25, 1941, Serial No. 385,092

4 Claims. (Cl. 23—63)

This invention relates to the treatment of natural trona to produce pure sodium salts, not only those typified by sodium sesquicarbonate and soda ash, but also sodium salts that can be produced by treatment of trona with an acid such, for example, as sodium phosphates.

The pure mineral trona has the empirical formula $Na_2CO_3.NaHCO_3.2H_2O$, and when calcined at a low temperature it loses carbon dioxide and water with formation of soda ash ($Na_2CO_3$). Naturally occurring trona can not be applied directly to the production of, for example, sodium carbonate of commercial purity, because almost invariably it contains impurities in amounts which prevent such use. Only a little use has been made of trona for the production of pure sodium salts because of the difficulties that have been encountered in recovering them at a cost which would permit such a process to compete satisfactorily with soda ash or other sodium salts produced by chemical processes.

The invention is concerned particularly with trona occurring in Wyoming and which is accordingly sometimes referred to as Wyomingite. As an example, reference may be made to a large deposit of trona in Sweet Water County, Wyoming. This deposit, which occurs at a depth of about 1500 feet from the surface, is in a compact crystalline form and the mineral exhibits a brownish appearance. A typical analysis is as follows:

| | | |
|---|---|---|
| $Na_2CO_3$ | percent | 49.29 |
| $NaHCO_3$ | do | 33.18 |
| $H_2O$ | do | 17.07 |
| Fe | do | 0.04 |
| Water insoluble | do | 0.30 |
| $Cl_2$; $SO_3$ | | Trace |

As will be observed, the composition of this material is not quite that of the pure mineral trona, being a little high in normal carbonate. Distributed throughout the bed are stringers of shale, and the foregoing analysis is based upon mineral from which the shale has been removed. Even assuming that the mineral as mined could be satisfactorily and cheaply separated from shale, it would be difficult by known procedures to produce a refined ash comparable to and competitive with that produced by chemical processes because of the impurities represented by the iron and the water insoluble matter. Thus, soda ash produced by the ammonia soda process usually contains not over 0.0008 per cent of iron and not over about 0.03 per cent of water insoluble matter. When this trona is dissolved in water the solution is of dirty brown color due, apparently to organisms, most likely *Artemia salina*, which carry most of the iron present in the trona and which become colloidally dispersed in the solution. Consequently, removal of the iron to permissible limits is difficult, and soda ash made by conventional methods from this trona is buff colored due to the organisms which it contains.

It is among the objects of this invention to provide a process of separating from natural soluble salts the coloring matter, largely organic matter and iron, and especially a process of refining natural Wyoming trona, whereby to recover such salts in a state of high purity, which is practical, rapid, efficient, economical, and easily practiced with standard and readily available apparatus and materials.

A particular object is to provide a process embodying the foregoing advantages and in which the water and fuel requirements are at a minimum.

Yet another object is to provide a process of treating natural trona to remove coloring matter and which is simple, cheap, rapid and easily performed.

A further object is to provide a process of recovering in a state of extraordinarily high purity sodium sesquicarbonate from trona, which may, if desired, be converted into soda ash.

The invention may be described with reference to the accompanying drawings in which Fig. 1 represents the solubility relationships of the trona constituents applied in the practice of the invention; and Fig. 2 is a flow sheet representative of the preferred practice of the invention as applied to the making of soda ash from trona.

The invention is primarily predicated upon my discovery that organically carried iron may be removed easily and cheaply from trona and other natural alkaline materials, with production of high purity products and at low cost, by treating the mineral as mined with a recycled brine containing the mineral constituents and by treating such solution prior to crystallization of the salt with an adsorbent which frees, or substantially frees, the solution from organic matter carrying iron and color-forming constituents. In the case of trona the brine will, according to the invention, be of such composition with respect to sodium carbonate ($Na_2CO_3$) and sodium bicarbonate ($NaHCO_3$) that sodium sesquicarbonate ($Na_2CO_3.NaHCO_3.2H_2O$) can be crystallized from it after solution of trona therein. By such recirculation of a brine adapted to dissolve trona and to crystallize the sesquicarbonate, the amount of water required is held at a minimum. This is of primary, and even controlling, importance in the treatment of trona or other minerals in regions such as those of the Wyoming beds where water is scarce.

As indicated above, soda ash made from sodium sesquicarbonate recovered from a solution of trona by conventional methods or by directly calcining the trona can not compete with ash produced by chemical processes because objectionable amounts of iron appear and the product is off color. A particularly important feature of the invention, therefore, is my discovery that the organic matter and iron may be quickly and readily lowered to within satisfactorily small limits by the simple expedient of treating the saturated brine with an adsorbent. In this manner the solution is easily and rapidly conditioned for crystallization of sodium sesquicarbonate in a state of exceptionally high purity, and the operation is sufficiently inexpensive so that in combination with the economy which flows from the use of recycled brine it is possible to produce sodium salts of high quality and at lower cost than those produced by chemical procedures.

As exemplifying the unusually efficient action of the adsorbent material in this step of the process, it may be noted that although the natural trona carries on an average of 0.04 per cent of iron, refined soda ash produced in accordance with this invention contains only about 0.0008 per cent of iron, or about the amount present in good commercial ash produced by the ammonia soda process, and as will appear hereinafter, soda ash produced in accordance with the present invention is otherwise of substantially greater purity than is that produced by the commercial chemical process.

Fig. 1 represents the solubility relationships of which use is made in the practice of the invention. The lower graph represents the composition of brines of sodium carbonate and bicarbonate at about 30° C., and the upper graph represents the relationships at about 100° C., and both graphs show compositions which are saturated with reference to sodium sesquicarbonate. A brine saturated with sesquicarbonate as shown by the lower graph is brought into contact with a body of natural trona which is to be refined. By increasing the temperature the brine will dissolve the soluble matter from the trona, and upon cooling the resultant solution trona, or sodium sesquicarbonate, will be crystallized from it. Thus, a brine corresponding to the point A of the lower graph will contain, per hundred grams of water, approximately 5.4 grams of sodium bicarbonate and 23.4 grams of sodium carbonate. Upon heating this brine in the presence of trona the composition of the solution will change along the line A—B, and upon cooling the resultant solution sodium sesquicarbonate will be crystallized out with progressive impoverishment of the solution of carbonate and bicarbonate, this action occurring along line A—B until the point A is reached, when the brine is used for further treatment of fresh amounts of trona.

The longer the line A—B in Fig. 1, the greater the proportion of refined trona produced per cycle, and for this reason it is preferred to work with brines in the vicinity of point A, although any of the brines of the lower graph saturated with sesquicarbonate may be used. Thus, the brines used for treating trona and for recycling in accordance with the invention may contain per hundred grams of water from about 22 to 38 grams of sodium carbonate and from about 1 to 5.8 grams of sodium bicarbonate. The closer the point B comes to coinciding with the upper graph, the more refined sesquicarbonate is produced per cycle. However, as the point B approaches the upper curve the likelihood of loss of carbon dioxide, by decomposition of trona, increases, until at 100° C. the partial pressure of $CO_2$ from trona is equal to one atmosphere. It is, of course, easier to prevent decarbonation than to effect recarbonation, particularly as the latter requires considerable time and may not be very efficient. For this reason it is preferred to operate in a closed system and at a maximum temperature somewhat less than about 100° C., and preferably not over about 85° C. The process may be carried out satisfactorily at the latter temperature, which is my preferred practice. Of course, with adequate maintenance of $CO_2$ pressure, higher temperatures may be used.

The invention may be described with further reference to Fig. 2. A weighed charge of natural trona from a storage container 1 is placed in a solution vessel 2 which, for the purpose described hereinafter, is provided with a pressure-tight cover. Vessel 2 is provided also with suitable agitating means, such as a stirrer 3, and with heating means, suitably a steam coil 4. Recycled brine from a prior crystallization step is introduced into vessel 2, and while agitating the contents steam is supplied to bring the contents of the vessel to a suitable temperature, for example, about 85° C. The provision of a water-tight vessel enables the solution step to be carried out without loss of carbon dioxide. As an example of a suitable charge, for each ton of trona there will be added to the vessel 5.9 tons of a recycled brine containing 0.32 ton of sodium bicarbonate and 1.38 tons of sodium carbonate. This corresponds to the point A, Fig. 1. After the trona has been dissolved the solution will contain sodium carbonate and sodium bicarbonate approximately corresponding to the point B, Fig. 1.

Prior, during or after the solution treatment there is introduced into vessel 2 an adsorbent from a storage bin 5. A variety of adsorbent materials of different kinds are available for such purposes and are known in the art, but they are typified by activated charcoal, which I have found very efficaceous for the purposes of the invention. I have found that by using a brine as described adequate purification of solutions of the foregoing Wyoming trona is effected by the use of as little as 0.125 per cent of activated charcoal based upon the weight of the trona and brine present in vessel 2. The exact weight of adsorbent used will depend, of course, upon the particular adsorbent and the amount of iron to be removed. Inasmuch as this material may be recovered, an excess may be used. The essential is to have enough present in the hot solution, before crystallization occurs, to purify it. The solution is, of course, agitated to expose it fully to the adsorbent.

Prior to adding the adsorbent the contents of vessel 2 are preferably permitted to settle to cause the major portion of shale or the like insoluble matter to collect in the bottom of the vessel, which is then blown down into a filter 6, the brine filtrate being then returned to the solution vessel as shown in Fig. 1. After the action of the adsorbent carbon dioxide containing gas from a gas holder 7 is then supplied under pressure through a pump 8 to vessel 2 to force its contents through a suitable filter 9 where the solution is separated from the adsorbent and any other residual insoluble matter. The adsorbent may be recovered and passed to a calciner 5a to prepare it for reuse, the revivification of activated charcoal being a procedure well understood in the art.

The hot solution leaving filter 9 is water white. It flows to a storage container 10 where a constant partial pressure of carbon dioxide corresponding to that in vessel 2 is maintained from gas holder 7 by a pump 11, the partial pressure being preferably at least equal to the decomposition pressure of $CO_2$ from trona at the temperature of the solution. From storage container 10 the solution passes to a crystallizer where the temperature of the solution is lowered to about 30° C., causing crystallization of pure sodium sesquicarbonate. The slurry of brine and sodium sesquicarbonate from the crystallizer is treated to recover the salt, the brine being then recycled for treatment of a further amount of trona. The pure trona may be sold as such or it may be passed to a calciner to convert it to pure soda ash.

To these ends there may be used an 8-stage continuous vacuum crystallizer the first four, or warmer, stages 12 being provided with surface condensers 13 which are cooled in countercurrent series by the recycled mother liquor, which by this treatment becomes heated to about 63° C. The last four, or cooler, stages 14 are provided with water cooled barometric condensers 15. Although the brine enters crystallizers 12 at a maximum temperature of about 85° C., some $CO_2$ will be exhausted by the vacuum in the condensers, and as shown in Fig. 2 this may be re-injected into the cool mother liquor as it enters the condensing system. After leaving the condensing system, at about 63° C., the warmed mother liquor may be heated to about 85° C. before being returned to vessel 2. In the embodiment shown in Fig. 2 the liquor is passed to a heater 19 where it is brought to about 85° C. by steam and then passed to a storage vessel 2a where it is held at temperature and fed to vessel 2 according to need.

From the last of crystallizers 14 the slurry of brine and sodium sesquicarbonate is passed to a settling tank 16 and thence to a filter 17. The mother liquor is recycled in vessel 2 through the condensers 13, and the sodium sesquicarbonate from filter 17 is passed to a calciner 18.

The crystals formed in the crystallizers form a very free filtering cake. They are brilliant white and are so free from impurities that it is unnecessary to wash the cake. As evidencing this, the composition of soda ash made in accordance with this invention from the Wyoming trona described may be compared with that of typical soda ash made by the ammonia soda process:

| Impurity | Trona process | Ammonia soda process |
| --- | --- | --- |
| | Per cent | Per cent |
| NaCl | Nil | 0.24 |
| Na₂SO₄ | Nil | 0.02 |
| H₂O insol. | 0.01 | 0.03 |
| Fe | 0.0008 | 0.0008 |

The extraordinarily high purity of soda ash practiced in accordance with the present invention is strikingly obvious from the foregoing comparison which also emphasizes the benefits which flow from my discovery that the removal of iron, which is otherwise difficult, is very efficient.

Some water in the form of mother liquid is unavoidably removed from the process with the refined crystals. This may be compensated for by adding water as need be. The ratio of sodium carbonate to sodium bicarbonate in the mother liquor is considerably greater than it is in the natural trona so that continued removal of small amounts of mother liquid may deplete the sodium carbonate content of the recycled brine, but this may be corrected by occasional addition of soda ash from the calciner.

In practice it is preferred to operate the dissolving and purifying vessel 2 in batch fashion but to operate the crystallizer continuously. However, the entire process may be performed in batches or continuously as desired. Other modifications are permissible, of course, and the invention is applicable to natural alkaline minerals other than trona.

According to the provisions of the patent statutes, I have explained the principle and method of practicing my invention and have illustrated and described what I now consider to represent its best embodiments. However, I desire to have it understood that, within the scope of the appended claims, the invention may be practiced otherwise than as specifically illustrated and described.

I claim:

1. A cyclic process for producing soda ash from Wyoming trona carrying organic matter and contained iron which comprises dissolving the trona in a hot cycling brine of sodium carbonate and bicarbonate containing substantially more normal carbonate than bicarbonate, contacting the solution with an adsorbent and thereby removing said organic matter and contained iron, separating the solution from said adsorbent, cooling the solution, crystallizing and recovering refined crystallized sodium sesqui-carbonate with some of the said brine adhering to the crystals, calcining the crystals with adherent brine to produce soda ash, and cycling a portion of said soda ash to the cycling brine to maintain its ratio of normal sodium carbonate to bicarbonate.

2. A cyclic process for producing soda ash from Wyoming trona carrying organic matter and contained iron which comprises dissolving the trona in a cycling brine heated to about 80° to 100° C. and containing from about 22 to 38 grams of sodium carbonate and about 1 to 5.8 grams of sodium bicarbonate per 100 grams of water, contacting the solution with an absorbent and thereby removing said organic matter and contained iron, separating the solution from said adsorbent, cooling the solution, crystallizing and recovering refined crystallized sodium sesqui-carbonate with some of the said brine adhering to the crystals, calcining the crystals with adherent brine to produce soda ash, and cycling a portion of said soda ash to the cycling brine to maintain its ratio of normal sodium carbonate to bicarbonate.

3. A cyclic process for producing soda ash from Wyoming trona carrying organic matter and contained iron which comprises dissolving the trona in a hot cycling brine of sodium carbonate and bicarbonate containing substantially more normal carbonate than bicarbonate, contacting the solution with an adsorbent and thereby removing said organic matter and contained iron, separating the solution from said adsorbent, cooling the solution, crystallizing and recovering refined crystallized sodium sesqui-carbonate, and calcining the crystals to produce soda ash.

4. A cyclic process for producing soda ash from Wyoming trona carrying organic matter and contained iron which comprises dissolving the trona in a cycling brine heated to about 80° to 100° C. and containing from about 22 to 38 grams of sodium carbonate and about 1 to 5.8 grams of sodium bicarbonate per 100 grams of water, contacting the solution with an adsorbent and thereby removing said organic matter and contained iron, separating the solution from said adsorbent, cooling the solution, crystallizing and recovering refined crystallized sodium sesquicarbonate, and calcining the crystals to produce soda ash.

ROBERT D. PIKE.